United States Patent
Tokuyama et al.

(10) Patent No.: US 6,462,911 B1
(45) Date of Patent: *Oct. 8, 2002

(54) MAGNETIC HEAD SUPPORT MECHANISM AND MAGNETIC DISK DEVICE

(75) Inventors: Mikio Tokuyama, Tsukuba; Yukio Kato, Ibaraki-ken; Yoshinori Takeuchi, Ishioka; Shigeo Nakamura, Odawara, all of (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/384,406

(22) Filed: Aug. 27, 1999

(30) Foreign Application Priority Data

Aug. 28, 1998 (JP) ............................................ 10-242840
Aug. 28, 1998 (JP) ............................................ 10-242844

(51) Int. Cl.$^7$ ................................................. G11B 5/60
(52) U.S. Cl. ................................................... 360/245.7
(58) Field of Search .......................... 360/245.7, 245.5, 360/245.9

(56) References Cited

U.S. PATENT DOCUMENTS 5,282,103 A * 1/1994 Hatch et al. ................. 360/104
5,933,293 A * 8/1999 Bennin ........................ 360/104
5,959,807 A * 9/1999 Jurgenson ................... 360/104
6,151,195 A * 11/2000 Kajitani ..................... 360/245.5
6,266,212 B1 * 7/2001 Coon ......................... 360/245.7

FOREIGN PATENT DOCUMENTS

| JP | 59-151362 | 8/1984 |
| JP | 64-62876 | 3/1989 |
| JP | 2-149154 | 12/1990 |
| JP | 6-215511 | 8/1994 |
| JP | 9-134577 | 5/1997 |
| JP | 10-55636 | 2/1998 |

* cited by examiner

*Primary Examiner*—Robert S. Tupper
(74) *Attorney, Agent, or Firm*—Antonelli, Terry, Stout & Kraus, LLP.

(57) ABSTRACT

A magnetic head support mechanism comprises: a magnetic head for writing and reading data relative to a magnetic disk; a slider having a flying surface for flying over a surface of the magnetic disk, the slider having the magnetic head mounted thereon; a mounting portion on which the slider is mounted; a transverse frame connected to one end of the mounting portion; two flexible finger portions which extend respectively from opposite ends of the transverse frame, and are disposed respectively on opposite sides of the mounting portion; a beam portion connected at one end thereof to ends of the flexible finger portions; a spring portion connected at one end thereof to the other end of the beam portion; an arm mounting portion connected to the other end of the spring portion; and a slider posture control mechanism connecting a reverse surface of the slider at an air inflow-side end thereof to the beam portion.

7 Claims, 13 Drawing Sheets

MAGNETIC HEAD SUPPORT MECHANISM AND MAGNETIC DISK DEVICE

BACKGROUND OF THE INVENTION

This invention relates to a magnetic disk device (unit), and more particularly to a magnetic head support mechanism, having an excellent impact-resistant performance, and a magnetic disk device using this support mechanism.

It is reported (in IEEE Trans. Vol.31 No.6 p.3006 to 3008) that in conventional magnetic disk devices, when a large impact is applied in a direction perpendicular to a disk surface, a slider jumps off the disk surface, and is tilted in this jumped condition, and then is brought into contact with the disk surface at a corner portion of its flying rail, thereby damaging the disk surface. It is also reported in this literature that it is effective to provide "a jump stop" above the slider in order to reduce the damage of the disk by the above impact.

JP-A-8-102159 discloses a mechanism in which pin projections (limiter portions) are formed on a cover and a base of a magnetic disk device, and even if the magnetic disk device receives an impact, so that a suspension, having a magnetic head mounted on its free end, is shaken, the suspension is brought into contact with the pin projection at its free end, and therefore is prevented from being further displaced toward the base or the cover.

In the above conventional mechanisms, the height (amount) of jumping of the slider off the disk surface is limited by the jump stop or the pin projections, and hence is kept to below a predetermined level, thereby reducing the speed and acceleration at which the slider impinges on the disk. By doing so, damage to the slider and the disk upon impingement is reduced so as to enhance the impact performance of the magnetic disk device.

On the other hand, the degree of damage is determined by the magnitude of the speed and acceleration, at which the slider is brought into contact with the disk, and the size of the area of contact therebetween. More specifically, the contact area much varies in dependent on whether the flying surface (which is opposed to the disk surface, and produces a flying force) of the slider comes into contact with the disk surface in parallel relation thereto, or a corner portion of the flying surface or a bleed surface (which is opposed to the disk surface, and does not produce a flying force) comes into contact with the disk surface as a result of rotation (tilting) of the slider. Therefore, even if the slider comes into contact with the disk surface at the same speed or acceleration, the contact surface pressure (stress) much varies in dependent on the area of contact between the two, that is, the posture of the slider impinging on the disk surface. As a result, the degree of damage much varies. In the above prior art techniques, this is not taken into consideration.

In other words, by controlling the posture of the slider, obtained when the slider, once jumped upon application of an impact, again comes into contact with the disk surface, the proper contact area can be secured (that is, the reduction of the contact area can be prevented), and the contact surface pressure (stress) and hence the damage can be reduced.

A magnetic disk device, having a load-unload mechanism, suffers from a problem that at the time of an unloading operation in which a slider, flying over a rotating disk surface, is separated (moved away) from the disk surface, if the unloading operation is forcibly effected, a flexible flexure is damaged since the slider sticks to the disk surface (if the slider is of the negative pressure-assisted type), so that the slider can not fly in a stable manner.

SUMMARY OF THE INVENTION

In the light of the above-mentioned problems, it is an object of this invention to provide a magnetic disk device in which even if a slider jumps off a disk surface when the magnetic disk device receives an impact, the amount of movement of the slider away from a pivot is limited, and also the deformation of a gimbal is prevented.

Another object of the invention is to provide a magnetic head support mechanism in which the posture of a slider, obtained when the slider again comes into contact with the disk, is controlled so as to prevent the reduction of a contact area and also to prevent contact damage, thereby enhancing an impact-resistant performance.

A further object of the invention is to provide a magnetic head support mechanism suitable for use in combination with a load-unload mechanism.

A magnetic head support mechanism of the present invention comprises a slider, which has a magnetic head mounted thereon, and can fly over a rotating disk surface, and a suspension which holds the slider, and presses the slider toward the disk surface from a reverse surface (facing away from a flying surface of the slider facing the disk surface) of the slider, and an air inflow-end of the slider and a beam portion of the suspension are connected together by a flexible member. With this construction, the ability of the slider to follow the rotating disk surface will not be lowered, and besides the slider is prevented from being much rotated upon application of an external impact or the like. Here, this flexible member is referred to as "slider posture control mechanism". Thanks to the provision of this slider posture control mechanism, the slider will not be much moved away from the beam portion at the time of an unloading operation, and therefore flexible finger portions will not be deformed.

BRIEF DESCRIPTION OF THE DRAWINGS

FIG. 1c is a sectional view taken along line Ic—Ic of FIG. 1a;

FIG. 6b is an enlarged view of the portion A in FIG. 6a;

FIG. 11b is a sectional view taken along line XIb—XIb in FIG. 11a;

DESCRIPTION OF THE PREFERRED EMBODIMENTS

A first embodiment of the present invention will be described with reference to FIGS. 1 and 2.

Figure 2:
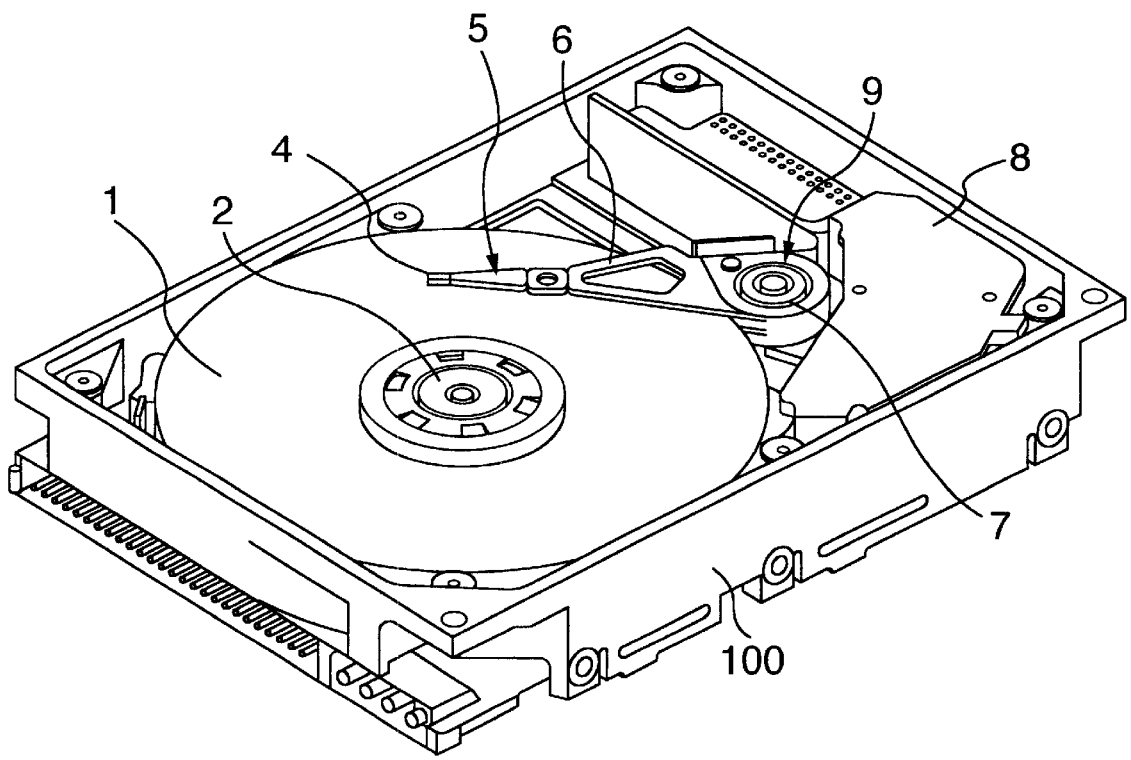
FIG. 2 is a perspective view showing an overall construction of a magnetic disk device of the invention.

FIG. 2 shows an overall construction of a magnetic disk device incorporating a magnetic head support mechanism of the first embodiment.

In FIG. 2, magnetic disks 1 for recording information are mounted on A spindle motor 2 in a stacked manner. A magnetic head (not shown) for recording and reproducing information relative to the magnetic disk 1 is mounted on a slider 4 mounted on a distal end portion of the magnetic head support mechanism (suspension) 5. The magnetic head support mechanism 5 is connected to an arm 6. The magnetic head can be positioned or located in a required radial position by a carriage 9 comprising a pivot bearing 7 and a voice coil motor 8. These mechanisms are mounted on a base 100 of a lunch box-shape, and are sealed therein by a cover (not shown).

FIG. 1 shows the magnetic head support mechanism of the first embodiment. FIG. 1a is a top plan view of the magnetic head support mechanism 5, FIG. 1b is a side elevational view thereof, FIG. 1a is a cross-sectional view taken along the line Ic—Ic of FIG. 1a, and FIG. 1d is a bottom view thereof.

As shown in the drawings, in the magnetic head support mechanism of the present invention, a spring portion 11 is connected to an arm mounting portion 10. The spring portion 11 is connected to a beam portion 12. The beam portion 12 comprises flanges 12a and a flat portion 12b. Two flexible finger portions 13 are connected to the flat portion 12b. A transverse frame 14 is connected to distal ends of the flexible finger portions 13. A slider mounting portion 15 for mounting the slider 4 thereon extends from a central portion of the transverse frame 14 toward the beam portion 12. The slider 4 is fixedly secured to the slider mounting portion 15 by an adhesive. A window 16 is formed between the slider mounting portion 15 and the flexible finger portions 13.

The spring portion 11, the beam portion 12, the flexible finger portions 13, the transverse frame 14 and the mounting portion 15 are integrally formed therewith by a single thin sheet. Although this thin sheet is made of stainless steel, the material of the thin sheet is not particularly limited, and for example, it may be made of titanium.

Before the magnetic head support mechanism 5 is mounted on the device, the spring portion 11 is bent at a predetermined angle, and then the magnetic head support mechanism 5 is mounted on the device in such a manner that the spring portion 11 is disposed generally parallel to the disk surface, and with this arrangement a pressing load for the slider 4 is produced by the flexing of the spring portion 11. This pressing load is transmitted to the slider 4 via the beam portion 12, the flexible finger portions 13, the transverse frame 14 and the mounting portion 15. A slider posture control mechanism 20 is provided on a reverse surface (facing away from the flying surface) of the slider 4 at an inflow-side end thereof (into which an air stream, produced in accordance with the rotation of the disk, flows).

Figure 1A:
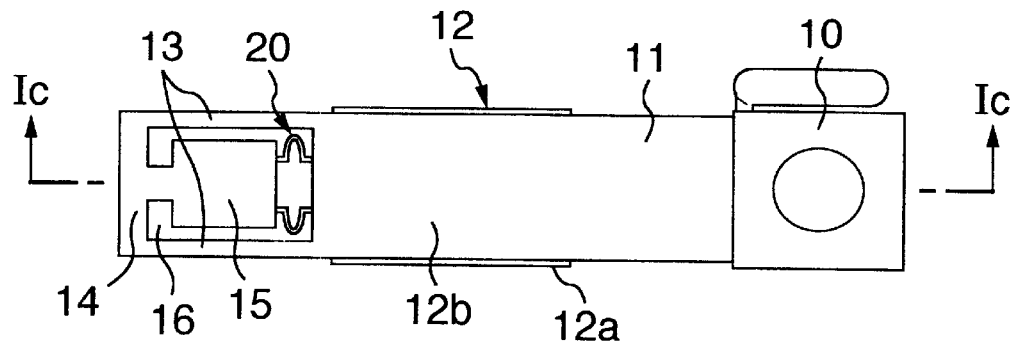
FIG. 1a is a top view showing a first embodiment of a magnetic head support mechanism of the present invention.

In FIG. 1a, part of the slider posture control mechanism 20, extending from the slider mounting portion 15 to the flat portion 12b of the beam portion 12, can be seen. The slider posture control mechanism 20 is symmetrical with respect to the centerline (axis) of the magnetic head support mechanism 5.

Figure 1B:
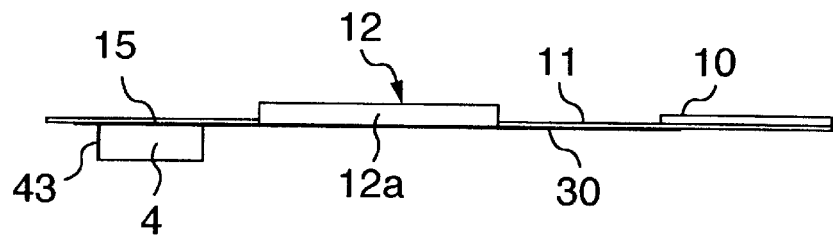
FIG. 1b is a side view of the first embodiment.
Figure 1C:
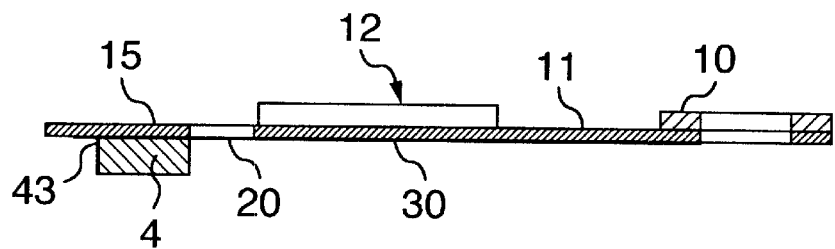

As shown in FIGS. 1b and 1c, the magnetic head 43 is mounted on an outflow-end surface of the slider 4. The slider 4 is mounted on the mounting portion 15 through a R/W signal-transmitting FPC 30 for transmitting read/write (R/W) signals from the magnetic head 43. The R/W signal-transmitting FPC 30 extends from the flexible finger portions 13 to the arm mounting portion 10 through the beam portion 12 and the spring portion 11.

Figure 1D:
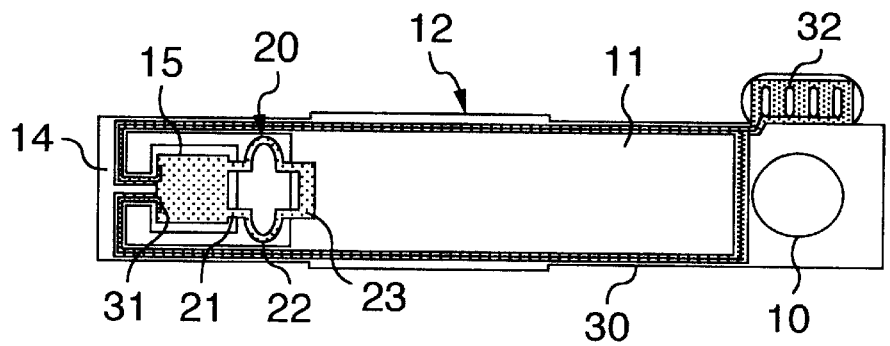
FIG. 1d is a bottom view of the first embodiment.

FIG. 1d shows the bottom side of the magnetic head support mechanism 5, but for better understanding of the slider posture control mechanism 20, illustration of the slider 4 is omitted from this Figure. The R/W single-transmitting FPC 30 is bonded to the mounting portion 15, and R/W signal-transmitting wires 31 extend from the magnetic head 43 to a FPC relay pad 32 via the R/W single-transmitting FPC 30 mounted on the transverse frame 14, the flexible finger portions 13, the beam portion 12 and the spring portion 11. The slider posture control mechanism 20 is formed integrally at the other end of the R/W single-transmitting FPC 30. Namely, in this embodiment, part of the FPC 30 is used as the slider posture control mechanism as described later.

The slider posture control mechanism 20 comprises lead portions 21, curved portions 22 and a beam-connecting portion 23. The lead portions 21 are connected at their one ends to the other end portion of the R/W single-transmitting FPC 30 bonded to the mounting portion 15, and the curved portions 22 extend respectively from the other ends of the lead portions 21, and the other ends of the curved portions 22 are connected to the beam-connecting portion 23. The beam-connecting portion 23 is bonded to the beam portion 12 by an adhesive or the like. The slider posture control mechanism 20 is symmetrical with respect to the centerline. With this symmetrical construction, the turning movement (rolling vibrations) in the direction of the width of the slider is made uniform, and also the influence of the slider posture control mechanism 20 on the rotation (turning movement) of the slider 4 is reduced.

The slider posture control mechanism 20 is formed integrally with the R/W signal-transmitting FPC 30. The slider posture control mechanism 20 differs from the R/W signal-transmitting FPC 30 in that the former has no R/W signal-transmitting wire 31 since it does not need to transmit any R/W signal. In order to reduce the influence of the slider posture control mechanism 20 on the flying characteristics of the slider 4, the slider posture control mechanism 20 is required to have low rigidity and also to have a high tensile strength. Therefore, generally, polyimide is used as a base material for FPC, but nylon, vinyl, carbon fibers and so on may be added to polyimide so as to increase the tensile strength.

Next, advantages of the present invention will be described with reference to FIG. 3.

Figure 3A:
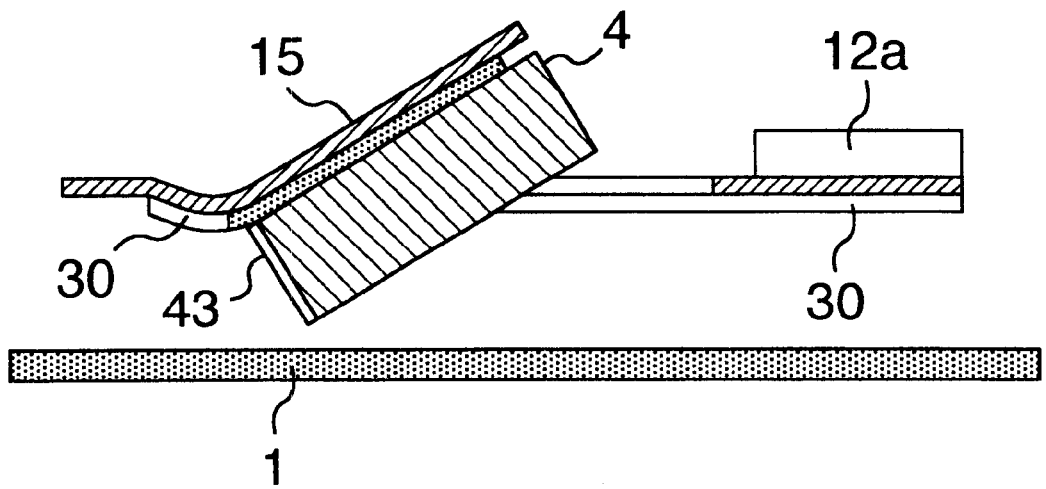
FIGS. 3a and 3b are views explanatory of the behavior of a slider when an impact is applied.
Figure 3B:
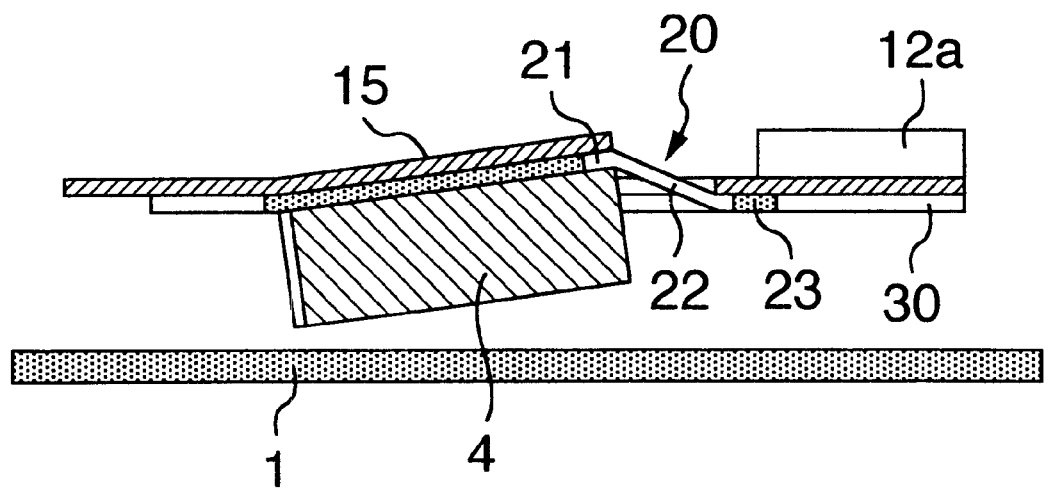

FIG. 3 show the behavior of a slider obtained when an impact is applied at the time of stopping a disk in a magnetic disk device of a CSS system. FIG. 3a shows a construction without the slider posture control mechanism 20, and FIG. 3b shows a construction with the slider posture control mechanism 20.

In the case of the construction of FIG. 3a, since there is not provided the slider posture control mechanism 20, the slider 4 is much rotated (turned) in response to the magnitude of the impact, so that a magnetic head 43 may impinge on the disk. It has been confirmed through our tests that the slider can be rotated 30 degrees or more. On the other hand, in the case where there is provided the slider posture control mechanism 20 as shown in FIG. 3b, the rotation of the slider 4 is limited by the slider posture control mechanism 20, and therefore the angle of rotation of the slider 4 can be controlled. And besides, this rotation angle can be freely controlled by adjusting the curvature of the curved portions 22 of the slider posture control mechanism 20.

In other words, the slider 4 and the beam portion 12 are connected together by the slider posture control mechanism 20 with a predetermined degree of looseness or flexibility. This looseness (flexibility) is determined by the curvature of the curved portions 22, and therefore is adjusted by the value of this curvature. The looseness (flexibility) increases with the increase of this curvature, so that the maximum rotation angle of the slider increases. In contrast, the maximum rotation angle of the slider decreases with the decrease of this curvature. Usually, the maximum rotation angle of the slider is set to the range of between about 3 degrees and about 5 degrees in view of manufacturing tolerances and the ability of the slider to follow the disk.

With respect to the relation between the angle of contact between the slider 4 and the disk 1 and the contact surface pressure, the larger the contact angle is, the higher the contact surface pressure is. Therefore, damage to the disk due to this contact is large. It is confirmed through calculation that the contact surface pressure, developed at the contact angle of 30°, is more than 10 times larger than that developed at the contact angle of 3°. By suppressing the angle of contact of the slider 4 with the disk 1 by the provision of the slider posture control mechanism 20, damage of the disk due to an impact can be reduced.

As described above, in the present invention, the angle of rotation of the slider 4, obtained when the slider 4 jumps at an impact, is suppressed by the slider posture control mechanism 20, and by doing so, the angle of contact between the slider and the disk can be kept to a small value. With this arrangement, the contact surface pressure between the slider and the disk can be reduced, and therefore contact damage of the magnetic head 43 and the disk 1 can be reduced, thereby enhancing the reliability.

The slider posture control mechanism 20 is formed integrally with the R/W signal-transmitting FPC 30, and therefore there is no need to add a new production step to a conventional production process, and therefore the mass-productivity will not be lowered.

Figure 4:
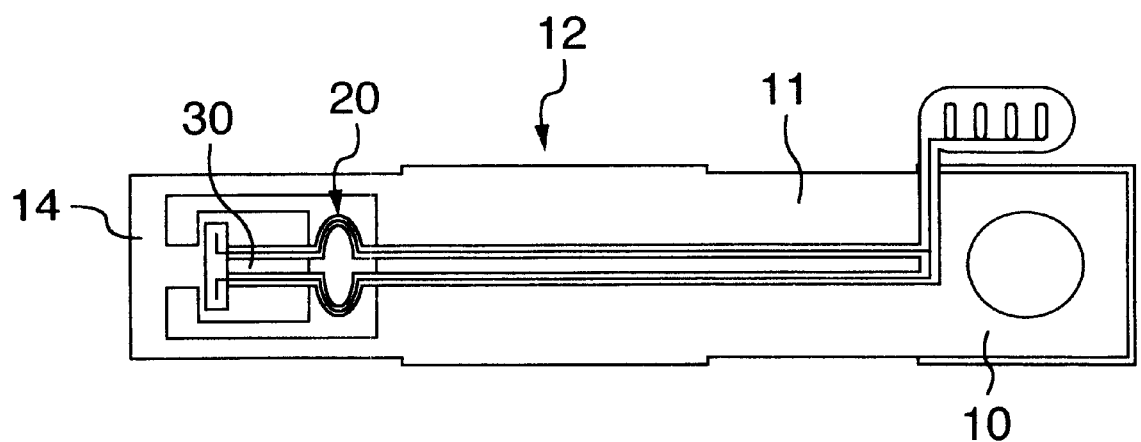
FIG. 4 is a view showing a second embodiment of a magnetic head support mechanism of the invention.

FIG. 4 shows a second embodiment of the invention. In this drawing also, the illustration of a slider 4 is omitted for better understanding of a slider posture control mechanism 20. In the first embodiment, that portion of the other end portion of the FPC 30, having no signal wire, is used as the slider posture control mechanism 20, and alternatively the slider posture control mechanism 20 comprises a member which is separate from the FPC 30, and is bonded to the FPC 30. On the other hand, in this embodiment, that portion of a R/W signal-transmitting FPC 30, having signal wires, is used as the slider posture control mechanism 20. In this embodiment, there can be provided a head support mechanism in which the number of component parts is reduced as compared with the first embodiment, and the angle of rotation of the slider due to an external impact can be controlled so that this head support mechanism can have a high resistance to an impact.

Figure 5:
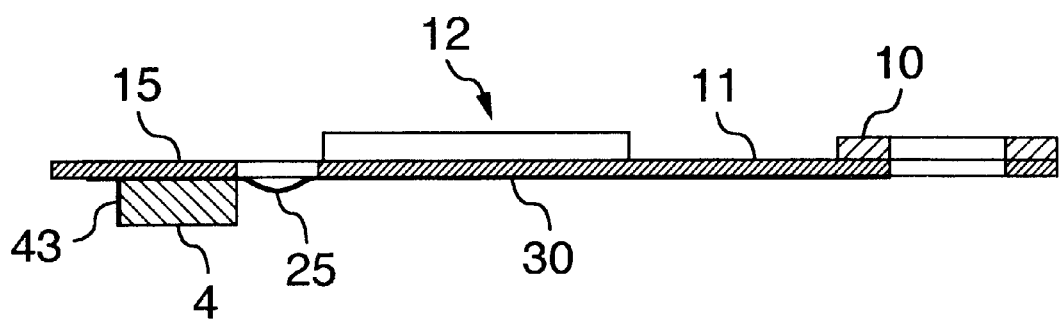
FIG. 5 is a view showing a third embodiment of a magnetic head support mechanism of the invention.

FIG. 5 is a side-elevational view of a third embodiment of the invention. This embodiment differs from the first embodiment in that the curved portions 22 of the slider posture control mechanism 20, disposed in a horizontal plane, are replaced by curvature portions 25 three-dimensionally projecting at the slider flying surface side. The degree of looseness (flexibility) is determined by the size of the curvature of the three-dimensional curvature portions 25. In this embodiment, the curved portions 22, disposed in a horizontal plane, are eliminated, and therefore the size of the slider posture control mechanism 20 can be reduced. In this embodiment, also, the angle of rotation of the slider due to an external impact can be controlled, and therefore similar advantages as achieved in the first embodiment can be obtained.

Figure 6A:
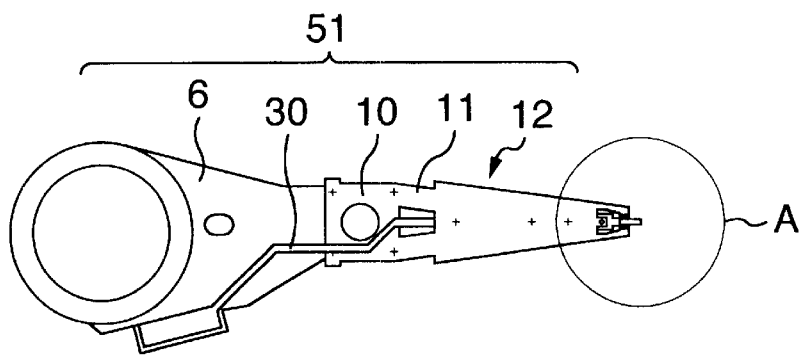
FIG. 6a is a top view showing a fourth embodiment of a magnetic head support mechanism of the invention.
Figure 6B:
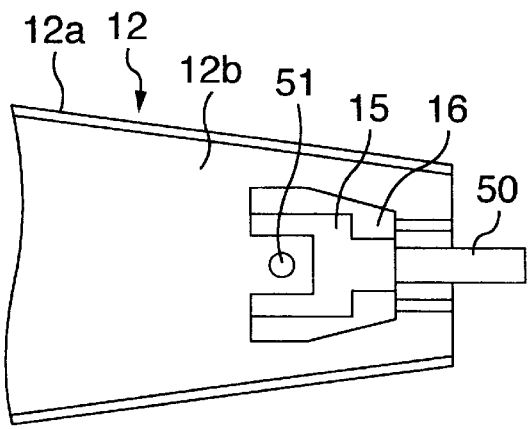
Figure 6C:
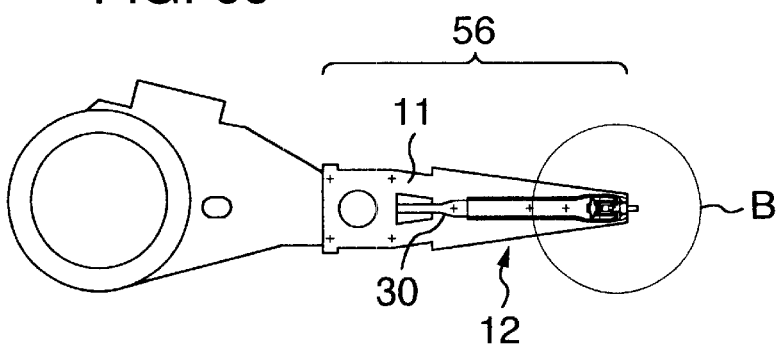
FIG. 6c is a bottom view of the fourth embodiment.
Figure 6D:
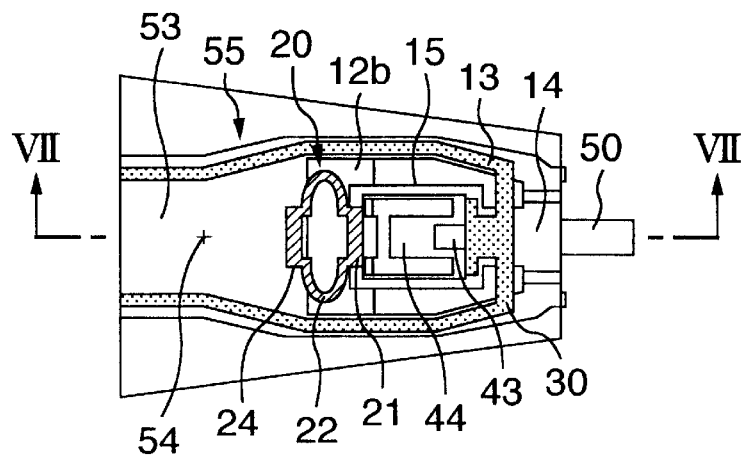
FIG. 6d is an enlarged view of the portion B in FIG. 6c.
Figure 7:
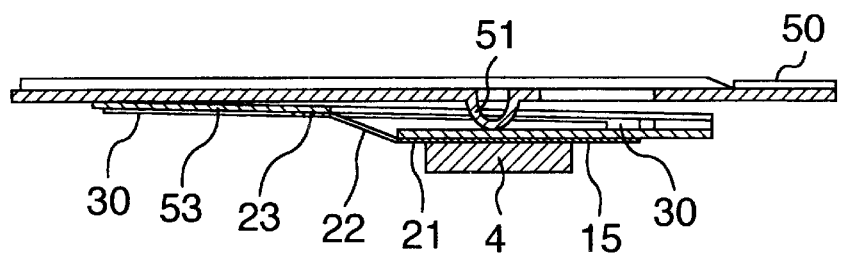
FIG. 7 is a sectional view taken along line VII—VII in FIG. 6d.
Figure 8A:
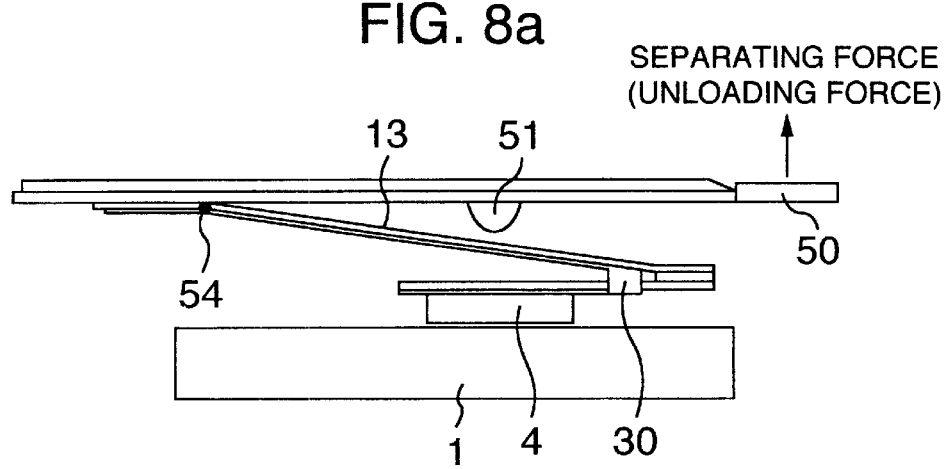
FIGS. 8a and 8b are views explanatory of the function of the fourth embodiment.
Figure 8B:
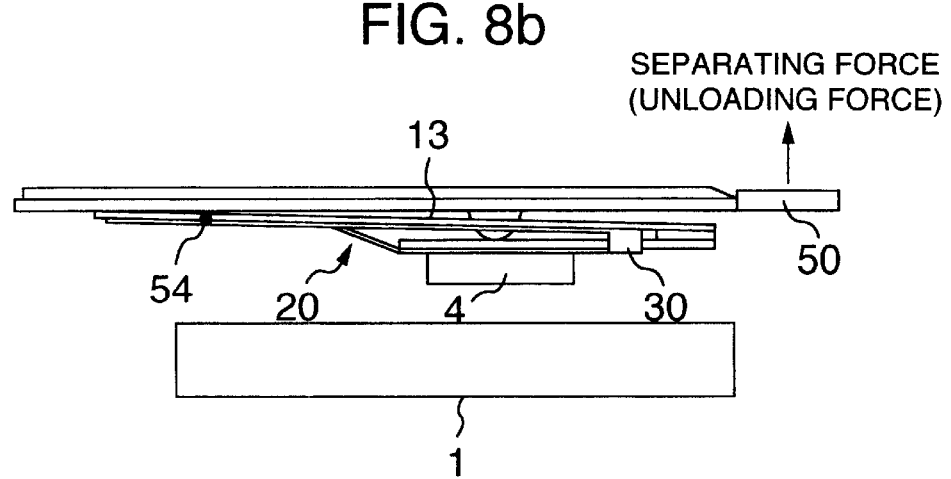

A fourth embodiment of the invention will be described with reference to FIGS. 6 to 8. FIG. 6a is a top plane view of a magnetic head support mechanism, and FIG. 6c is a bottom view thereof. FIG. 7 is a cross-sectional view taken along line VII—VII of FIG. 6d (which is an enlarged view of the portion B), and FIGS. 8a and 8b show the function of the fourth embodiment.

A major difference of this embodiment from the first embodiment is that there is provided an arm-integral-type magnetic head support mechanism 51 in which the arm 6 and the magnetic head support mechanism 5 are integrally connected together at an arm mounting portion 10 by spot welding. The magnetic head support mechanism 5 comprises three portions, that is, a suspension portion, comprising a beam portion 12 and a spring portion 11, a flexure 55, comprising a slider mounting portion 15, a transverse frame 14, flexible finger portions 13 and a beam-connecting portion 53, and a slider 4. A load-transmitting pivot 51 and a slider-lifting tab 50 are provided at the beam portion 12, and the beam-connecting portion 53 of the flexure 55 is bonded to the beam portion 12 by spot welding.

As shown in FIG. 6, the magnetic head support mechanism 5 is spot welded to the arm 6 at the arm mounting portion 10. The slider-lifting tab 50 for separating the slider from the disk surface is provided at the distal end of the beam portion 12. A window 16, enabling the observation of the mounting portion 15, is formed in a flat portion 12b of the beam portion 12. The pivot 51 for transmitting a load to the slider is also provided at the beam portion 12. As shown in FIG. 6c, a slider posture control mechanism 20 is formed integrally at a distal end of a mounting portion of a R/W signal-transmitting FPC 30, and comprises a lead portion 21, curved portions 22 and a flexure-connecting portion 24.

In this embodiment, instead of the beam connecting portion 23 of the first embodiment, the flexure connecting portion 24 of the slider posture control mechanism 20 is connected to the flexure 55. The slider 4, having a magnetic head 43 mounted thereon, is a negative-pressure slider which utilizes both positive and negative pressures produced in accordance with a relative movement between the slider 4 and the disk 1.

As can be seen in FIG. 7, the pivot 51, provided at the beam portion, pivotally supports the slider 4 at a reverse surface thereof. The lead portion 21 of the slider posture control mechanism 20 is bonded to the slider 4, and the flexure-connecting portion 24 is bonded to the beam-connecting portion 53 of the flexure 55.

Advantages of this embodiment will be described with reference to FIG. 8.

In a conventional head support mechanism, the negative pressure slider 4 sticks to the disk surface by suction when the lift tab 50 is to be unloaded (lifted) by a load/unload mechanism, and therefore the mounting portion is moved away from the pivot 51 as shown in FIG. 8a, which leads to a possibility that the flexible finger portions 13 are plastically deformed beyond its elasticity region, and are damaged.

On the other hand, in the case where there is provided the slider posture control mechanism 20 as shown in FIG. 8b, a separating force can be applied from the lift tab 50 directly to the slider 4, that is, not through the flexible finger portions 13.

Therefore, the slider is prevented from moving away from the pivot, and also the deformation and damage of the flexible finger portions 13 can be prevented. Therefore, there can be provided the magnetic head support mechanism of high reliability suitable for the load/unload mechanism. In this embodiment, also, if this support mechanism is used in a magnetic disk device of a CSS system, there can be provided the magnetic head support mechanism having an excellent impact-resistance performance as in the first embodiment.

Figure 9A:
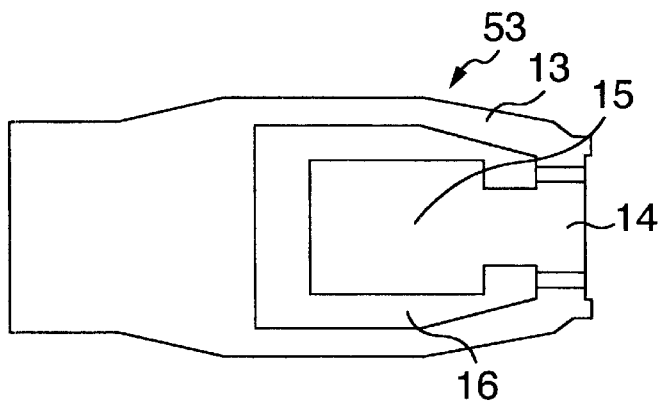
FIGS. 9a to 9d are views showing a method of forming a slider posture control mechanism.
Figure 9B:
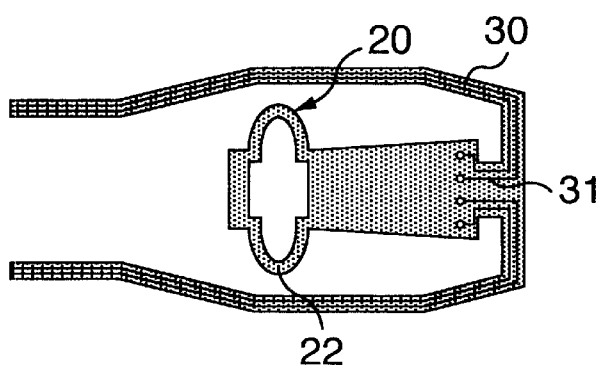
Figure 9C:
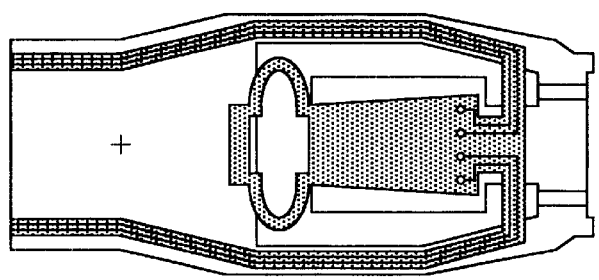
Figure 9D:
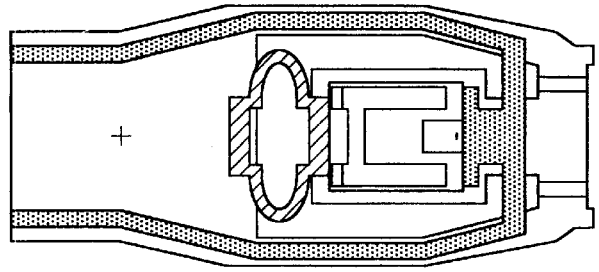
Figure 10:
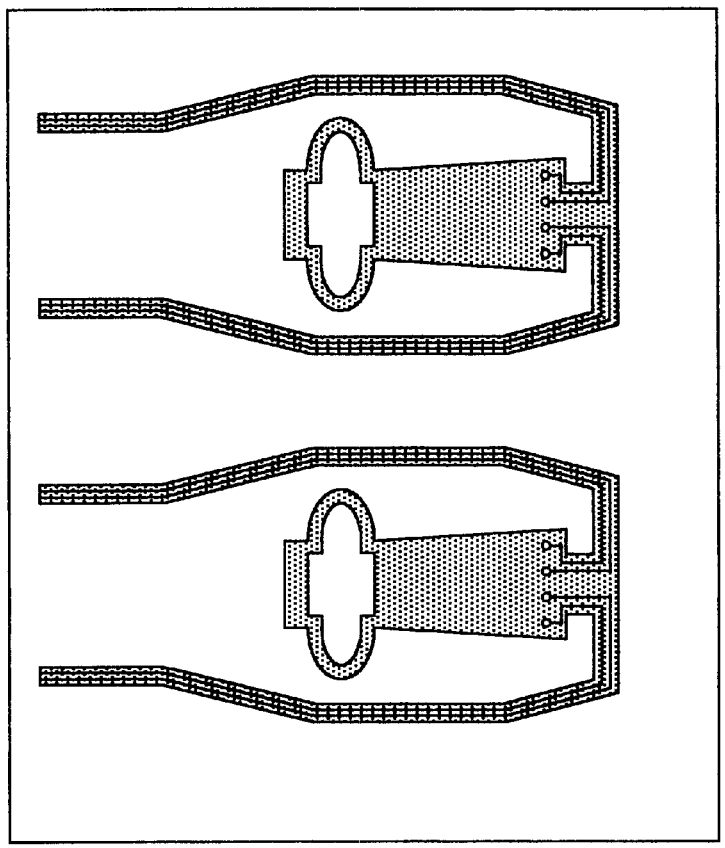
FIG. 10 is a view showing another method of forming a slider posture control mechanism.
Figure 10:
Figure 10:
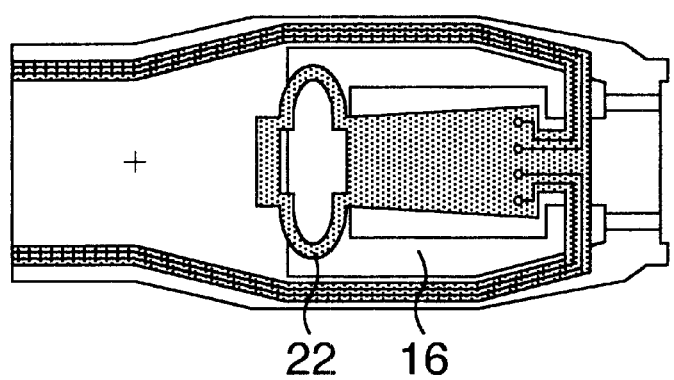

Methods of forming the slider posture control mechanism 20 are shown in FIGS. 9 and 10.

In the method of FIG. 9, the flexure 55 and the slider posture control mechanism 20 are prepared separately from each other (FIGS. 9a and 9b), and the two are bonded together by an adhesive or the like (FIG. 9c), and thereafter the slider is mounted on the slider mounting portion (FIG. 9d). In this method, the slider posture control mechanism 20 is formed integrally with the R/W signal-transmitting FPC 30 (FIG. 9b). The FPC is formed by an ordinary method, and therefore explanation of details of this method is omitted here. Since the R/W signal-transmitting FPC 30 is bonded to the flexure 55, the FPC has generally the same shape as that of the flexure 55.

The signal-transmitting wires (signal wires) 31 comprise four wires, and extend from a region corresponding to the terminals of the magnetic head. On the other hand, a plurality of flexure 55 are formed from a stainless sheet by etching, and are pressed into a predetermined shape, and then are separated from the sheet by cutting (FIG. 9a).

Then, the slider posture control mechanism 20 (FIG. 9b), formed integrally with the R/W signal-transmitting FPC 30, is affixed to the flexure 55 as shown in FIG. 9c. Thereafter, the slider 4 is affixed to the flexure 55 by an adhesive, with the magnetic head registered with the terminals of the signal-transmitting wires 31 (FIG. 9d).

In this method, the slider posture control mechanism 20 and the flexure 55 are formed from the separate members, respectively, and then are bonded together. Therefore, it is possible to easily produce a play (looseness) of the slider posture control mechanism 20 by curving the FPC three-dimensionally to affix to the flexure.

Specifically, the slider posture control mechanism 20 can be affixed to the flexure in such a manner that the relevant straight portions are curved as at the curvature portions 25 of FIG. 5. In other words, the curved portions 22 can be provided in a three-dimensionally flexed condition, and therefore even if the (two-dimensionally) curved portions 22 can not be provided because of a limited space, a play (looseness), which is the function of the curved portions 22, can be obtained by three-dimensionally flexing the relevant portions.

In the other method of FIG. 10, the slider control mechanisms 20 and the R/W signal-transmitting FPCs 30 are formed directly on a stainless sheet for forming the flexures 55. As described above, the FPC is formed by an ordinary method, and therefore explanation thereof is omitted here. Thereafter, the flexures 55 are formed by etching, and are pressed into a predetermined shape, and then are separated from the sheet. That portion of the stainless steel on the reverse side of the curved portions 22 of each slider posture control mechanism 20 is removed simultaneously when the window 16 is formed between the flexible finger portions 13 and the mounting portion 15 by etching, and therefore only the curved portions 22 remain at this region.

In this method, the FPCs are formed directly on the flexure-forming sheet, and therefore this method is excellent in mass-productivity. However, the three-dimensionally-curved portions 22 can not be formed, and therefore the two-dimensionally-curved portions 22 with a curvature must be formed.

In the first to fourth embodiments, although the slider posture control mechanism is formed, utilizing part of the R/W signal-transmitting FPC 30, this control mechanism can naturally formed using a separate resilient material (such as spring steel, which can be easily formed into a predetermined shape) instead of the R/W single-transmitting FPC 30.

Figure 11A:
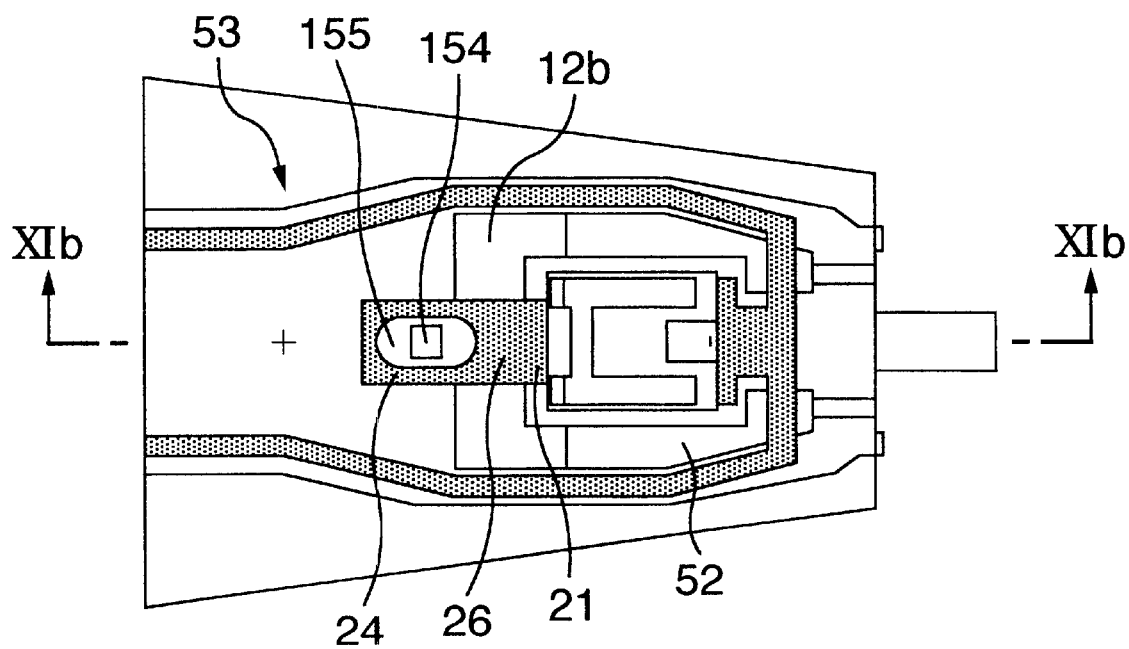
FIG. 11a is a top view showing a fifth embodiment of a magnetic head support mechanism of the invention.
Figure 11B:
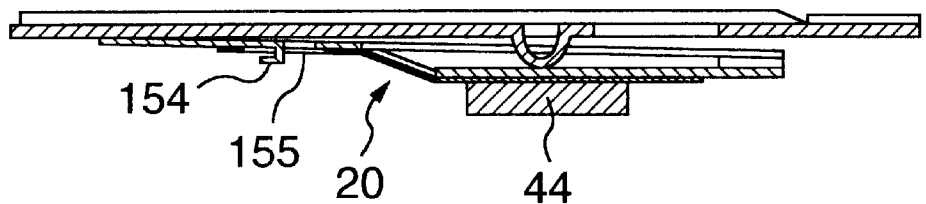

FIG. 11 shows a fifth embodiment of the invention. This embodiment differs from the fourth embodiment in that a slider posture control mechanism 20 of this embodiment has a straight portion 26 which replaces the curved portions 22 of the fourth embodiment, that a window 155 is formed through a distal end portion of this straight portion 26, and that a hook 154 is provided in the window 155.

A flexure-connecting portion 24 of the slider posture control mechanism 20 of this embodiment is not bonded to a flexure 55, and can move within the range of the window 155 (until the hook 154 engages with the window 155) in accordance with the rotation or movement of the slider. Namely, when an impact is applied from the exterior, the flexure-connecting portion 24 is much pulled in accordance with the movement of the slider, and is engaged with the hook 154. Therefore, the movement (posture) of the slider is limited. As a result, the angle of contact between the slider and the disk can be controlled. Therefore, with the use of this mechanism, the rigidity of the slider posture control mechanism 20 can be reduced substantially to zero. With this construction, it becomes unnecessary to care about that the rigidity is increased by increasing the tensile strength. In this embodiment, also, similar advantages as described for the fourth embodiment can be expected. In this embodiment, the slider posture control mechanism 20 need to be made of such a material that the curved portions 22 and the flexure-connecting portion will not be much changed in shape. Therefore, the slider posture control mechanism need to be made of a material having a certain degree of (relatively high) rigidity.

Here, the slider posture control mechanism can be the same configuration as that of the above slider posture control mechanism 20 by extending a slider-mounting portion 15 of the flexure 55 toward the hook 154. With this construction, similar advantages as achieved in the fifth embodiment can be expected. And besides, since the slider-mounting portion 15 is used as the posture control mechanism 20, the number of the component parts is reduced, so that the productivity is enhanced.

Figure 12:
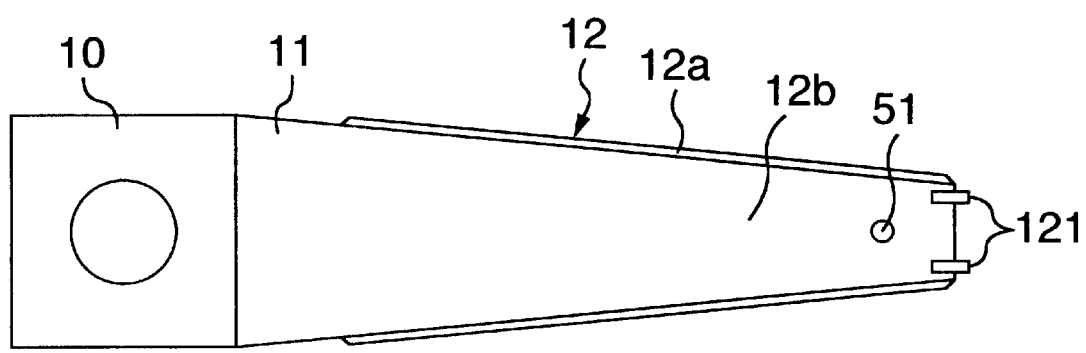
FIG. 12 is a view showing a sixth embodiment of a magnetic head support mechanism of the invention.
Figure 13:
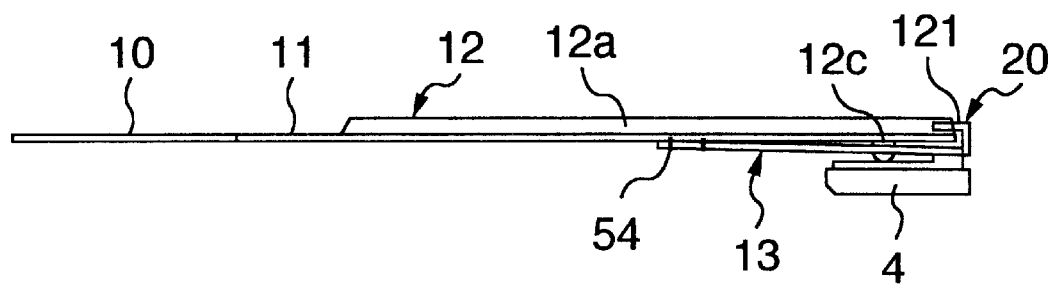
FIG. 13 is a view of the sixth embodiment.

FIG. 12 is a plan view of a sixth embodiment of a magnetic head support mechanism 5 of the invention. FIG. 13 is a side-elevational view of the magnetic head support mechanism 5 of FIG. 12. An arm-mounting portion 10 to be connected to an arm 6 is connected to a spring portion 11, and the spring portion 11 is connected to a beam portion (flange portion) 12. The flange portion 12 comprises flanges 12a and a flat portion 12b, and two hook end portions 121 of hook mechanisms (serving as a slider posture control mechanism 20) are disposed in overlying relation to a distal end portion of the flat portion 12b.

Before the magnetic head support mechanism 5 is mounted on the device, the spring portion 11 is bent at a predetermined angle, and then the magnetic head support mechanism 5 is mounted on the device in such a manner that the spring portion 11 is disposed generally parallel to the disk surface, and with this arrangement a pressing load for the slider 4 is produced by the flexing of the spring portion 11. This pressing load is transmitted to a slider 4 via a pivot 51 formed at the flange portion 12.

As shown in FIG. 13, a flexure 55 is bonded at one end to a slider mounting-side portion of the flange portion 12 by spot welding 54. The slider posture control mechanism 20 is provided at the other end portion of the flexure 55, and the slider 4 is also held on this end portion.

Figure 14A:
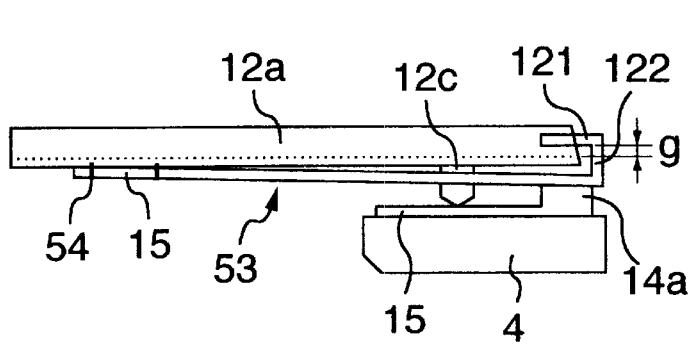
FIG. 14a is top view showing a slider and its neighboring members in the sixth embodiment.
Figure 14B:
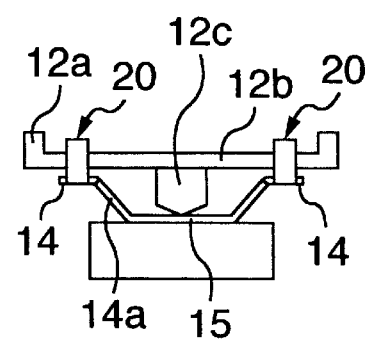
FIG. 14b is a side view of the slider and its neighboring members in the sixth embodiment.
Figure 15A:
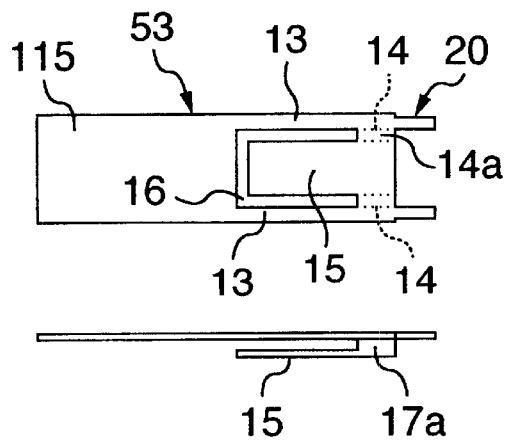
FIGS. 15a and 15b are views showing the procedure of forming the slider posture control mechanism of the sixth embodiment.
Figure 15B:
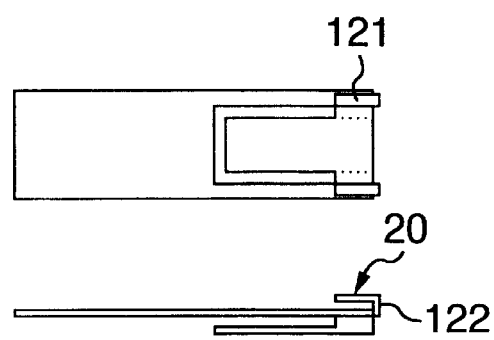

FIGS. 14a and 14b are views showing the slider and its neighboring portions on an enlarged scale, and FIGS. 15a and 15b show the flexure.

As shown in FIG. 15a, the flexure 55 comprises a single flat sheet. More specifically, the flexure 55 includes a connecting portion 115 to be affixed to the lower surface of the flat portion 12b of the beam portion 12, a U-shaped window 16, formed through that portion of the flat portion 12b disposed forwardly of the connecting portion 115, a slider-mounting portion 15 (for mounting the slider 4 thereon), surrounded by the window 16, flexible finger portions 13, which are formed respectively at opposite side edge portions of the flexure 55 in parallel relation to parallel side portions of the U-shaped window 16, transverse frames 14, each interconnecting the mounting portion 15 and the corresponding flexible finger portion 13, and having a step portion 14a, and the hooks (serving as the slider posture control mechanisms 20) which are formed respectively at the distal ends of the transverse frames 14.

As shown in FIG. 14, the slider 4 is mounted on the slider mounting portion 15 of the flexure 55, and the mounting portion 15 is connected to the step portions 14a of the transverse frames 14. Each of the two hook mechanisms (serving as the slider posture control mechanisms 20), formed respectively at the distal ends of the transverse frames 14, comprises a vertical portion 122, extending generally perpendicular to the mounting portion 15, and the hook end portion 121 extending from a distal end of the vertical portion 122. The hook end portion 121 is spaced a predetermined distance g from the flat portion 12b of the flange portion 12 and is in generally parallel with the flat portion 12b.

When the hook end portions 121 come into contact with the flat portion 12b, the ability of the slider 4 to follow the rotating disk surface is adversely affected. Therefore, usually, the contact between the two must be avoided. Therefore, it is necessary to provide the gap g of such a nominal value that the two will not come into contact with each other even if manufacturing tolerances are taken into consideration.

However, if this gap g is too large, the hook mechanisms fail to perform the intended function, and the flexure 55 is much deformed to be plastically deformed when an impact force is applied. It is also necessary to provide such a play that the movement of the slider 4 will not be restrained. In this embodiment, the nominal value of the gap g is, for example, 50 $\mu$m in view of the current manufacturing tolerances and variations in the posture angle (pitch angle and roll angle) of the slider. The thickness of the flexure 55 is, for example, 20 $\mu$m to 30 $\mu$m, but is not particularly limited.

As shown in FIG. 14b, the slider posture control mechanisms 20 are formed at the two transverse frames 14, respectively. By thus providing the two hooks (serving as the slider posture control mechanisms 20), the hooks can be prevented from being damaged by an impact, and also the rolling angle (rotation angle in the widthwise direction) of the slider 4 can be kept to a small value. With this construction, even when the slider jumps off the disk surface at an impact, and then comes into contact with the disk surface, the rotation of the slider 4 is limited, thereby reducing the rolling angle at the time of contact of the slider with the disk surface. Therefore, the disk surface is prevented from being damaged by a corner portion of the slider 4 upon an impact, and also its value can be reduced.

Thanks to the provision of the slider posture control mechanisms 20, the slider 4 will not be much moved away from the pivot, and therefore the pitching angle of the slider 4 can be kept to a small value. As a result, even when an impact is applied, the slider 4 is kept generally parallel to the beam portion 12. Therefore, the slider 4 is held generally parallel to the disk surface even at the time when the slider 4 again comes into contact with the disk surface, and therefore there will not be encountered a situation in which the slider rotates, and damages the disk surface at its sharp corner portion.

FIGS. 15a and 15b show the detailed construction of the flexure, incorporating the slider posture control mechanisms of the sixth embodiment, as well as a method of forming this flexure.

As described above, the slider mounting portion 15 is connected to the transverse frames 14 through the step portions 14a, and the flexible finger portions 13 extend respectively from the transverse frames 14, and are disposed respectively on the opposite sides of the mounting portion 15. The connecting portion 115 to be affixed to the flange portion 12 are formed at the other ends of the flexible finger portions 13. The window 16 is formed between the connecting portion 115 and the mounting portion 15. The hook portions, serving as the slider posture control mechanisms, extend respectively from the transverse frames 14, and are disposed adjacent to the rear end of the slider.

In FIG. 15a, the flexure is formed into a sheet by etching, and the step portions 14a are shaped by press working. In FIG. 15b, the hook portions are bent by press working. The flexure is formed in this manner, and therefore the productivity is excellent.

As described above, in this embodiment, an amount of movement of the slider away from the pivot can be kept small by the hook mechanisms, so that the plastic deformation of the flexure (flexible finger portions) due to undue deformation thereof is prevented so as to maintain the stable flying of the slider, and also the angle of contact between the slider and the disk is controlled to a small value, thereby reducing damage to the disk. The slider posture control mechanisms are formed by press-working the flexure, and therefore the productivity is excellent.

A seventh embodiment of the invention will be described with reference to FIGS. 16 to 19. A major difference of this embodiment from the sixth embodiment is that, a beam portion 12 is also worked in this embodiment so as to perform part of a function of a hook portion serving as a slider posture control mechanism 20 although the slider posture control mechanisms 20 are provided at the distal end of the flexure 55 in the preceding embodiment. More specifically, a distal end portion of a flat portion 12b of the beam portion 12 is worked to form a U-shaped holder portion 41 of a hook portion. An engagement portion 123 of the hook portion is formed at a distal end of a flexure 55. The engagement portion 123 can be received in the U-shaped holder portion 41 through a window 16 formed through the flat portion 12b of the beam portion 12.

Figure 16:
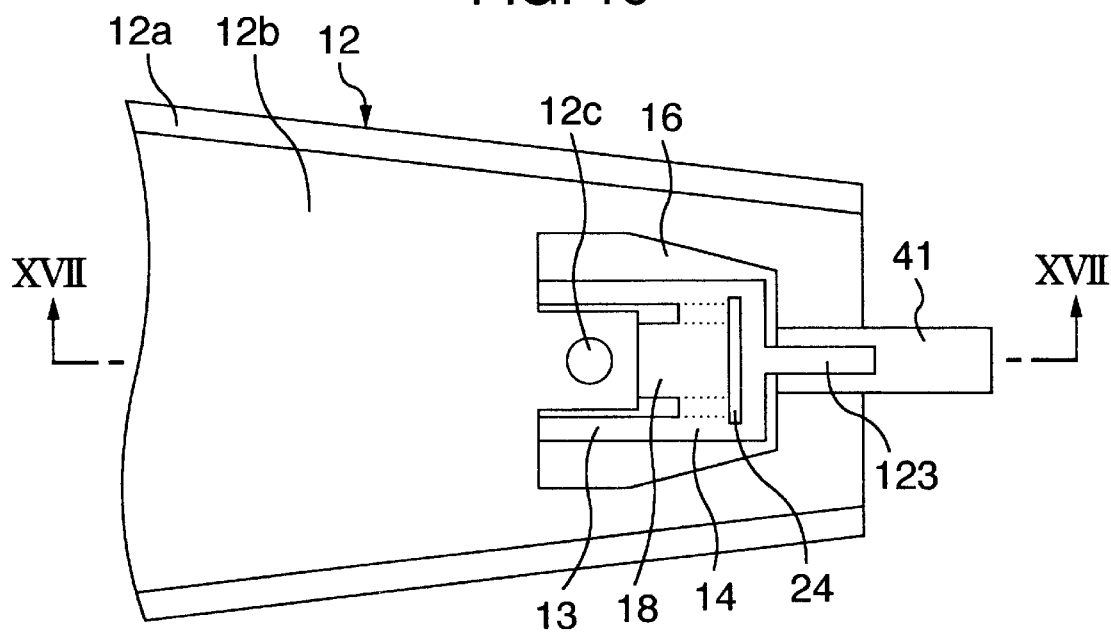
FIG. 16 is a view showing a seventh embodiment of a magnetic head support mechanism of the invention.
Figure 17:
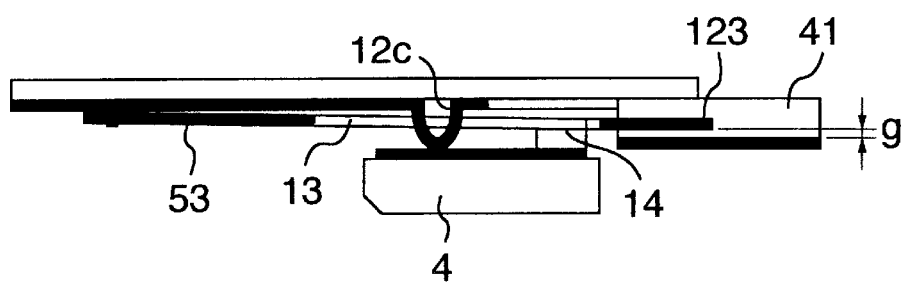
FIG. 17 is a cross-sectional view taken along the line XVII—XVII of FIG. 16.
Figure 18:
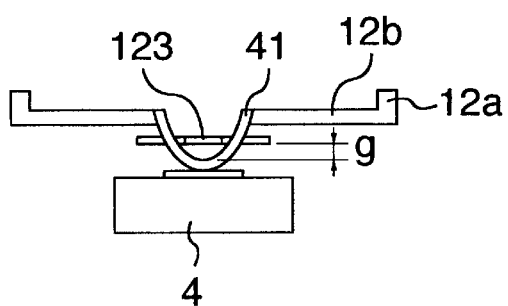
FIG. 18 is a front-elevational view of the seventh embodiment.

Identical reference numerals in this embodiment and the sixth embodiment denote the corresponding members, respectively. More specifically, as shown in FIGS. 16, 17 and 18, the engagement portion 123 (formed at the distal end of the flexure 55) of the slider posture control mechanism 20 is held in a U-shaped groove (defined by the U-shaped holder portion 41) through the window 16 formed through the beam portion 12, and is spaced a predetermined distance g therefrom. The purpose and size of this gap g are the same as described above for the sixth embodiment.

FIG. 17 is a cross-sectional view taken along the line XVII—XVII of FIG. 16, and FIG. 18 is a front-elevational view of the magnetic head support mechanism of FIG. 16. The engagement portion 123, formed at the distal end of the flexure 55, is disposed in a plane in which a beam-connecting portion 53, flexible finger portions 13 and transverse frames 14 lie, and two-step bending (processing) as required in the sixth embodiment is not needed, and therefore this construction is excellent from the viewpoint of productivity.

Figure 19:
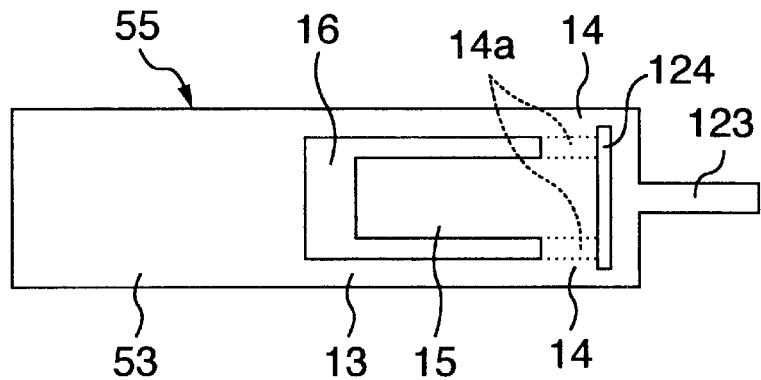
FIG. 19 is a view showing the construction of a flexure portion of the seventh embodiment.

FIG. 19 shows details of the engagement portion 123 formed at the flexure. As described above, the engagement portion 123 is disposed in a plane in which the transverse frames 14, the flexible finger portions 13 and the beam-connecting portion 53 lie, and is extended from the transverse frames 14 in a direction opposite to the beam-connecting portion 53. Therefore, any additional press working is not required for forming the slider posture control mechanism 20. Namely, the slider posture control mechanism can be formed only by etching. In the formation of the slider posture control mechanism, a window 124 is provided not so as to receive influence from the press working of step portions 14a.

As described above, in this embodiment, also, an impact-resistant performance can be enhanced as in the sixth embodiment. And besides, since the slider posture control mechanism can be formed easily, there is achieved an advantage that the productivity is high. Furthermore, the U-shaped hook holder mechanism is suitable also for a head support mechanism of a ramp-type load-unload system.

Specifically, in such a ramp-type system, a slider is moved into facing relation to a disk surface, and is separated from the disk surface while part of a magnetic head mechanism is held in sliding contact with a ramp portion. In such a mechanism, it is necessary to avoid the contact of the slider with the disk surface, and therefore the reliability depends on whether or not the slider can be satisfactorily moved toward and away from the disk surface in parallel relation thereto.

A slider of the negative pressure-assisted type, which has now been extensively used, sticks to a rotating disk surface, and therefore a larger force is required at the time of a loading operation, and as a result there has been encountered a problem that a flexure is deformed. In this embodiment, there is provided the slider posture control mechanism (hook portion), and a lift tab holder portion 50 as used in the second embodiment can provide a sliding surface for sliding contact with the ramp, and therefore the slider can be loaded on and unloaded in parallel relation to the disk surface, and damage of the slider by contact with the disk can be prevented. And besides, in the slider of the negative pressure-assisted type, by the provision of a hook portion, the deformation of the flexure can be prevented, and also the unloading operation can be effected easily.

Figure 20A:
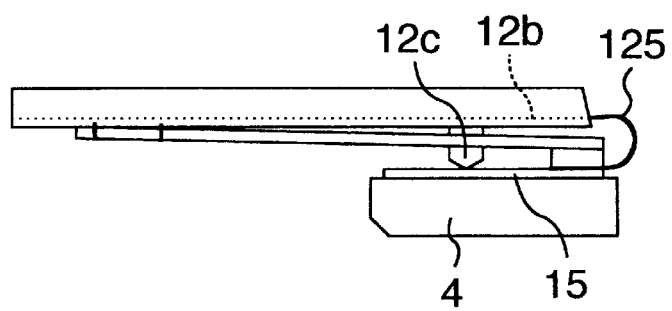
FIG. 20a is a view showing an eighth embodiment of a magnetic head support mechanism of the invention.
Figure 20B:
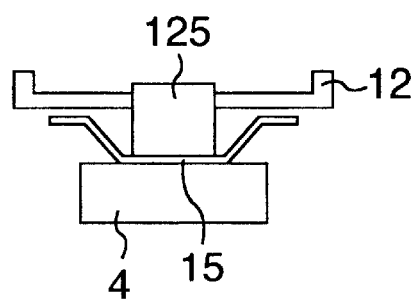
FIG. 20b is a front view of the eighth embodiment.

FIGS. 20a and 20b show an eighth embodiment of the invention. FIG. 20a is a cross-sectional view of a head support mechanism, and FIG. 20b is a front-elevational view of a slider portion.

This embodiment differs from the sixth embodiment in that a slider posture control mechanism (hook portion) comprises a flexible sheet 125 which has low rigidity and a high tensile strength. One end of this sheet 125 is secured to a slider mounting portion 15 while the other end thereof is secured to a flat portion 12b of a beam portion 12. The sheet 125 has slight looseness (deflection) δ. The sheet 125 is secured to the mounting portion 15 and the flat portion 12b by an adhesive which produces little gas.

The flexible sheet 125 of this embodiment is usually low in rigidity, and will not adversely affect the flying characteristics of a slider when it is deflected. However, when the slider 4 is moved away from a pivot 51 by an impact and the like, so that the above-mentioned looseness (deflection) δ is eliminated, its high tensile strength prevents the slider 4 from being moved away from the beam portion 12. The above looseness performs a function similar to that of the gap g in the sixth embodiment, and is set to a value generally equal to that of the gap. And besides the slider posture control mechanism has a sheet-like shape, and therefore the rolling movement of the slider 4 is limited.

In this embodiment, a conventional magnetic head support mechanism can be used by slightly improving it, and therefore the production cost can be kept low. With the above construction, in this embodiment, similar advantages as achieved in the sixth embodiment can be obtained.

In this embodiment, although the flexible sheet 125, having the looseness, is used, it may be replaced by a wire (yarn) of a high tensile strength having looseness δ. As long as this wire is kept loose, it will not limit the movement of the slider, but when the looseness is eliminated, the wire positively restrains the movement of the slider. Therefore, similar advantages as achieved in the eighth embodiment can be obtained.

What is claimed is:

1. A magnetic head support mechanism comprising: a magnetic head for writing and reading data relative to a magnetic disk; a slider having a flying surface for flying over a surface of the magnetic disk, said slider having said magnetic head mounted thereon; a mounting portion on which said slider is mounted; a transverse frame connected to one end of said mounting portion; two flexible finger portions which extend respectively from opposite ends of said transverse frame, and are disposed respectively on opposite sides of said mounting portion; a beam portion connected at one end thereof to ends of said flexible finger portions; a spring portion connected at one end thereof to the other end of said beam portion; an arm mounting portion connected to the other end of said spring portion; a slider posture control mechanism including two connecting portions continuously spaced from one another in a width direction of said slider and connecting a surface of said slider which is opposite to the flying surface of said slider at an air inflow-side end of said slider to said beam portion, each of said two connecting portions including at least one curved portion therein; and at least one signal wire for at least transmitting data therealong extending from a region of said magnetic head to a region of said arm mounting portion on at least one of said two flexible finger portions without extending on said two connecting portions.

2. A magnetic head support mechanism according to claim 1, wherein said two connecting portions of said slider posture control mechanism have so low rigidity and high tensile strength as not to affect a flying posture of said slider, and connect said slider and said beam portion together with a predetermined degree of looseness.

3. A magnetic head support mechanism according to claim 2, wherein said mounting portion, said transverse frame, said flexible finger portions, said beam portion and said spring portion are formed from a thin sheet in integral relation to one another.

4. A magnetic head support mechanism according to claim 1, wherein said at least one curved portion is a substantially U-shaped curved portion.

5. A magnetic disk device comprising: a magnetic disk capable of recording and erasing information; a spindle motor for rotating said magnetic disk; and a magnetic head support mechanism which comprises (a) a magnetic head for writing and reading information relative to said magnetic disk, (b) a slider having a flying surface for flying over a surface of the rotating magnetic disk, said slider having said magnetic head mounted thereon, (c) a mounting portion on which said slider is mounted, and (d) a beam portion supporting said mounting portion through flexible finger portions;

wherein said magnetic head support mechanism includes a slider posture control mechanism having two connecting portions continuously spaced from one another in a width direction of said slider and which connect a surface of said slider which is opposite to the flying surface of said slider at an air inflow-side end of said slider to said beam portion, each of said two connecting portions including at least one curved portion therein; and wherein at least one signal wire for at least transmitting data therealong extends from a region of said magnetic head to a region of said arm mounting portion on at least one of said two flexible finger portions without extending on said two connecting portions.

6. A magnetic disk device according to claim 5, wherein said two connecting portions of said slider posture control mechanism have so low rigidity and high tensile strength as not to affect a flying posture of said slider, and connect said slider and said beam portion together with a predetermined degree of looseness.

7. A magnetic disk device according to claim 5, wherein said at least one curved portion is a substantially U-shaped curved portion.

* * * * *